G. T. COCHRAN.
CHURN.
APPLICATION FILED MAR. 21, 1911.

1,008,241.

Patented Nov. 7, 1911.

2 SHEETS—SHEET 1.

Witnesses
W. S. McDowell.

Inventor
George T. Cochran,
By Victor J. Evans
Attorney

G. T. COCHRAN.
CHURN.
APPLICATION FILED MAR. 21, 1911.

1,008,241.

Patented Nov. 7, 1911.

2 SHEETS—SHEET 2.

Witnesses

Inventor
George T. Cochran
By Victor J. Evans
Attorney

UNITED STATES PATENT OFFICE.

GEORGE T. COCHRAN, OF HUNDRED, WEST VIRGINIA.

CHURN.

1,008,241.  Specification of Letters Patent.  Patented Nov. 7, 1911.

Application filed March 21, 1911. Serial No. 616,007.

*To all whom it may concern:*

Be it known that I, GEORGE T. COCHRAN, a citizen of the United States, residing at Hundred, in the county of Wetzel and State of West Virginia, have invented new and useful Improvements in Churns, of which the following is a specification.

This invention relates to improvements in churns, and the object of the invention is to provide a churn of a comparatively simple construction, which is cheaply manufactured and which has all of its parts removable for cleaning or repairing, and which will churn cream to butter in a short time and at a minimum amount of physical exertion.

With the above and other objects in view, which will appear as the nature of the invention progresses, the invention resides in the novel construction and arrangement of parts hereinafter fully described and claimed.

Figure 1:
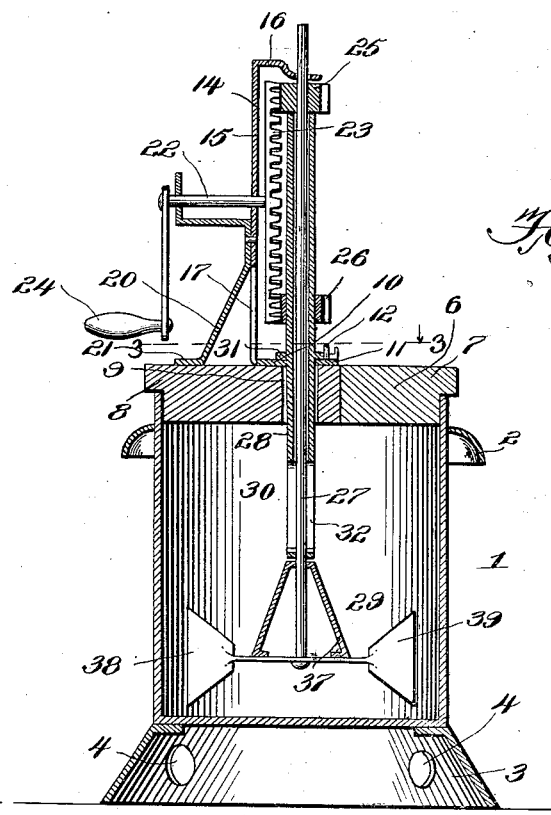
Figure 3:
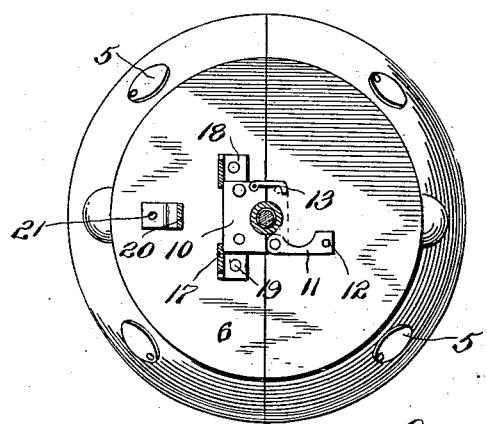
Figure 2:
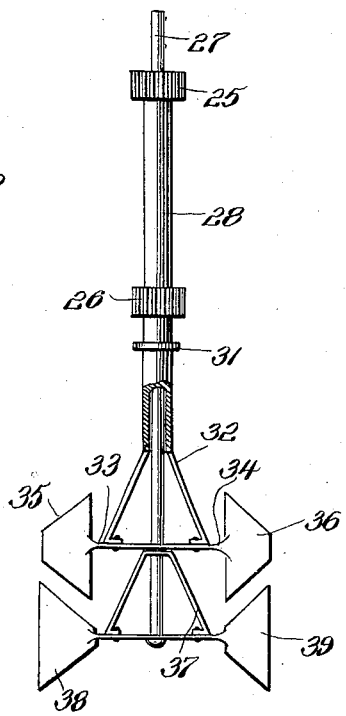
Figure 4:
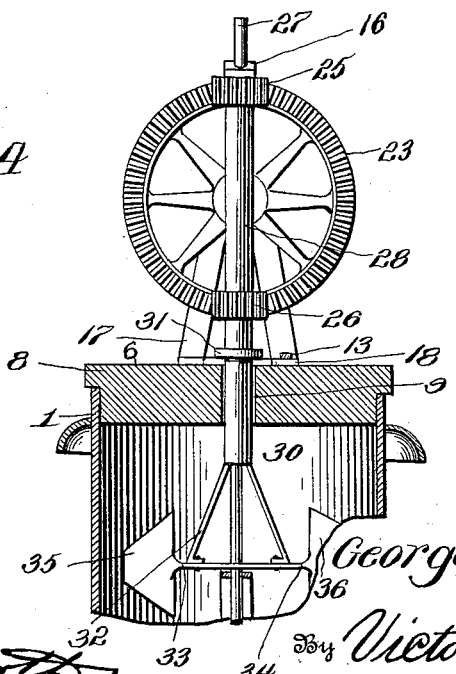

In the drawings—Figure 1 is a central vertical longitudinal view of the churn constructed in accordance with the present invention. Fig. 2 is a side elevation of the dashers and their staffs or spindles, the outer spindle being shown partly in section. Fig. 3 is a horizontal sectional view upon the line 3—3 of Fig. 1, the dashers' sustaining elements being shown in their open position. Fig. 4 is a detail sectional view taken at an angle to that shown in Fig. 1.

In the drawings, the numeral 1 designates the churn tub. This tub 1 is preferably constructed of some suitable metal, and comprises a rounded body portion having an open top and a closed bottom. The sides of the tub are provided with oppositely disposed handles 2, and the bottom of the tub is provided with a flared downwardly depending base 3. The base 3 is also constructed of a sheet of metal and has its face formed with a plurality of openings 4, the latter being arranged below the bottom of the churn tub and adapted to serve as air inlets to the bottom of the tub. The openings may be, and preferably are provided with sliding dampers 5, whereby the body of air passing through the openings may be readily regulated. By this arrangement the globules of the milk may be tempered to accord with climatic changes under which butter is churned by the device.

The numeral 6 designates the top or closure for the tub. This closure comprises a pair of sections 7 and 8, each of the sections when placed together forming a circular body which is adapted to tightly engage with the top of the tub. The sections 7 and 8 are also provided with annular ribs which are adapted to contact with the top edge of the tub and to limit the downward movement of the closure within the tub. The section 8 is of a greater width than that of the section 7, and the said section is centrally provided with a vertical depression 9 which has its inner wall arranged, and the said depression is adapted to receive the spindle of the dasher, as will presently be set forth.

The numeral 10 designates a plate having a centrally arranged portion alining with the rounded inner wall of the depression 9 and the said plate is sustained upon the top of the section 8 through the medium of suitable screws or other similar devices.

The numeral 11 designates a swinging plate which is also formed with a central substantially semi-cylindrical depression, and the said depression is adapted to register with the depression in the plate 10 when the said plate is swung closed upon the section 8. The end of the plate 11 opposite its pivot is provided with a lug 12 and the plate 10 is provided with a pivoted catch member 13 having an off-set lip which is adapted to engage with the lug 12 to hold the plate 11 into contact with the plate 10.

The numeral 14 designates a frame. This frame comprises a vertical member 15 having its upper extremity off-set as at 16 and provided with an opening which alines with the openings formed by the semi-cylindrical depressions of the plates and the depression 9 in the section 8. The frame 14 has its lower portion formed with off-set lugs 17, the same straddling the plate 9 and having their extremities formed with feet 18. The feet 18 are provided with suitable openings adapted for the reception of securing elements, such as screws 19. The rear portion of the vertical member of the frame is provided with an inclined lug 20, the lower extremity of the said lug is also formed with a foot 21, the same being provided with means whereby it is secured upon the section 8 of the closure 6. The lug 20 at its point of connection with the frame is bent rearwardly and has its extremity off-set and provided with an opening, the said opening registering with a similar opening within the frame proper, and both of these openings adapted to receive a shaft 22, the same having its inner portion provided with an enlarged toothed wheel 23 and its rear portion provided with an off-set handle 24. The toothed wheel 23 is adapted to mesh with a pair of smaller toothed wheels 25 and 26 carried by the spindles 27 and 28 of the churn dashers. The spindle 27 is connected with the lower dasher 29, and extends through the hollow spindle 28 of the upper dasher 30. The spindle 27 is of sufficient length to engage within the opening provided by the off-set 16 of the vertical member of the frame 14. The toothed wheel 25 which is connected with the said spindle 27 is adapted to mesh with the teeth upon the upper portion or face of the wheel 23. The toothed wheel 26 is securely connected with the hollow spindle 28, and meshes with the teeth upon the lower face of the wheel 23 when the spindles are positioned upon the closure. The numeral 31 designates a collar which is connected with the hollow spindle 28, and which is adapted to bear upon the plates 10 and 11.

From the above description, it will be noted that the dasher spindles 27 and 28 revolve in opposite directions and that the said spindles as well as the dashers connected therewith may be readily removed for cleaning by simply swinging the latch 13 away from the lug 12 to permit the plate 11 to swing away from the plate 10. It will be further noted that the closures are sufficiently tight to obviate the necessity of employing sustaining elements to retain the same upon the churn tub.

Connected with the lower portion of the hollow spindle 28 is a substantially V-shaped frame or support 32. The lower or horizontal portion of this support has its opposite ends twisted to form vertical extensions 33 and 34, and secured to each of these extensions are the substantially triangular shaped dashers 35 and 36. These dashers have their longer vertical edges arranged parallel with the spindles 27 and 28, as clearly illustrated in the figures of the drawing, and their apex adjacent the sides of the churn tub 1. The numeral 37 designates a substantially V-shaped frame or support similar to the support 32. This support is firmly connected with the spindle 27, the said spindle passing through an opening in the lower horizontal wall of the V-shaped support 32 and is connected with the lower horizontal member of the support 37. The said lower horizontal portion of the support 37 extends beyond its inclined sides and is twisted to provide vertical extensions. Secured to each of the said vertical extensions are the triangular lower dashers 38 and 39. The dashers 38 and 39 have their longer or vertical edges positioned adjacent the inner wall of the dasher tub 1, and their point or apex connected with the vertical twisted ends of the horizontal portion of the support 37. The upper inclined edges of the dashers 39 are spaced only a slight distance away from the lower inclined edges of the upper dashers, and it will be noted that the said dashers traveling in opposite directions and being of the peculiar or triangular formation violently contact the cream or milk within the churn to cause the same to flow between the dashers and contact the dashers in opposite directions, so as to break the globule of the milk or cream and quickly churn the same to butter. It will be also noted that by arranging the opposite edges of the churn dashers at an inclination to each other, the milk or cream can pass between the dashers at only an angle so that a whirling angular motion is given to the milk or cream and which tends to break the globule more rapidly than any other form of dashers heretofore known to the applicant.

Having thus fully described the said invention, what I claim is:

1. In a churn of the character set forth, a hollow spindle having its lower extremity provided with a substantially V-shaped frame, the lower horizontal portion of the frame being provided adjacent the sides of the frame with triangular dashers, a solid spindle passing through the hollow spindle, and having its lower extremity also provided with a V-shaped frame, the said frame having its upper portion engaging the lower portion of the upper frame, the lower member of this second frame being provided with triangular dashers arranged opposite that of the dashers carried by the first frame, and means for rotating the spindles in opposite directions.

2. In a churn of the class set forth, in combination with spindle operating means, of a hollow spindle and a solid spindle passing through the said hollow spindle, the hollow spindle having its lower portion formed with a substantially V-shaped frame, the lower horizontal wall of the frame being extended and bent to provide vertical members, a triangular dasher connected with each of the vertical members, each of said dashers having their vertical edges positioned adjacent the sides of the frame, the solid spindle being also provided with a substantially V-shaped frame positioned below the frame of the hollow spindle, the lower horizontal wall of the said frame having its ends extended and bent to provide vertical extensions, a triangular dasher having points or apexes secured to the said extensions to arrange the upper inclined edges in a plane with the lower inclined edges of the upper dashers, substantially as and for the purpose set forth.

In testimony whereof I affix my signature in presence of two witnesses.

GEORGE T. COCHRAN.

Witnesses:
   J. R. OLIVER,
   A. L. MOORE.

Copies of this patent may be obtained for five cents each, by addressing the "Commissioner of Patents, Washington, D. C."